United States Patent [19]

Howard

[11] 4,052,223
[45] Oct. 4, 1977

[54] TREATMENT OF PIGMENT

[75] Inventor: Peter Barry Howard, Yarm, England

[73] Assignee: Tioxide Group Limited, Billingham, England

[21] Appl. No.: 711,151

[22] Filed: Aug. 3, 1976

[30] Foreign Application Priority Data

Aug. 14, 1975 United Kingdom .............. 33826/75

[51] Int. Cl.$^2$ .............................................. C09C 1/36
[52] U.S. Cl. .................................. 106/300; 106/308 B
[58] Field of Search ............................ 106/300, 308 B

[56] References Cited

U.S. PATENT DOCUMENTS

| 3,497,373 | 2/1970 | Rieck et al. | 106/300 |
| 3,515,566 | 6/1970 | Moody et al. | 106/300 |
| 3,556,828 | 1/1971 | Durrant et al. | 106/300 |
| 3,567,479 | 3/1971 | Portes et al. | 106/300 |

Primary Examiner—Patrick P. Garvin
Assistant Examiner—J. V. Howard
Attorney, Agent, or Firm—Schuyler, Birch, Swindler, McKie & Beckett

[57] ABSTRACT

A process for the production of the highly durable titanium dioxide pigment in which the pigment is coated with a phosphate, a silicate and a hydrous oxide of zirconium and aluminium in specified carefully controlled amounts and order of deposition.

13 Claims, No Drawings

TREATMENT OF PIGMENT

This invention relates to a process for the treatment of a pigment and particularly to the treatment of titanium dioxide pigment.

According to the present invention a process for the treatment of titanium dioxide pigment comprises forming an aqueous dispersion of titanium dioxide containing as a dispersant 0.1% to 0.3% by weight of monoisopropanolamine, a water-soluble in an amount of from 0.05% to 0.5% by weight expressed as $P_2O_5$ or a mixture thereof, or a water-soluble silicate in an amount of 0.1% to 0.5% by weight expressed as $SiO_2$ used alone or together with the monoisopropanolamine and/or the phosphate, adding to the aqueous dispersion a water-soluble phosphate in an amount of 0.05% to 1.0% by weight expressed as $P_2O_5$ when the dispersing agent is not solely a phosphate, a water-soluble hydrolysable acidic compound of zirconium in an amount of from 0.2% to 2.5% by weight expressed as $ZrO_2$, a water-soluble hydrolysable acidic compound of aluminum in an amount of from 0.2% to 2.5% by weight expressed as $Al_2O_3$, a water-soluble compound of silicon in an amount of from 0 to 1% by weight expressed as $SiO_2$ and a water-soluble hydrolysable alkaline compound of aluminium in an amount of from 0.5% to 2.5% by weight expressed as $Al_2O_3$ and adjusting the pH of the dispersion, if necessary, to a value of from 6.5 to 8.5 prior to recovering the treated pigment from the dispersion; all the percentages by weight being based on the weight of titanium dioxide in the aqueous dispersion.

The present invention provides a process for the treatment of titanium dioxide pigment in such a manner that there becomes associated with the pigment a number of hydrous metal oxides or a phosphate so that the pigment when incorporated in a paint has a reduced photochemical activity.

The titanium dioxide pigment which is to be treated by the process of the present invention may be a pigment prepared by the well known "sulphate" process or a pyrogenic pigment prepared by the vapour phase oxidation of a titanium halide, e.g. the so called "chloride" process. Preferably, however, the pigment is a calcined titanium dioxide pigment and prepared by the "sulphate" process which involves the treatment of a titaniferous ore with concentrated sulphuric acid to produce a digestion cake which is then dissolved in water and dilute acid prior to hydrolysis of the solution of titanyl sulphate to precipitate the titanium dioxide in a hydrated form. Calcination of the hydrated titanium dioxide produces the pigmentary titanium dioxide in the anatase or rutile forms depending on the particular method of operation of the "sulphate" process. Preferably the titanium dioxide to be treated by the process of the invention is rutile titanium dioxide containing at least 95% by weight of its $TiO_2$ content in the rutile form as opposed to the anatase form.

The most preferred form of titanium dioxide to be treated by the process of the present invention contains from 0.1% to 0.5% by weight $Al_2O_3$ based on the weight of $TiO_2$. This alumina is formed during the calcination process or incorporated during the vapour phase oxidation process of an aluminum compound prior to calcination or oxidation of a titanium halide. Aluminium sulphate is a typical additive to the hydrated titanium dioxide to be calcined during the "sulphate" process and aluminium chloride is a typical additive to the vapour phase oxidation reactor in the "chloride" process.

Particularly when the titanium dioxide pigment to be treated is formed during the "sulphate" process the calciner discharge is milled in a dry milling process prior to treatment according to the method of the process of the present invention, the milling carried out by a ring or roller mill or hammer mill, for example.

The titanium dioxide pigment to be treated by the process of the invention is firstly formed into an aqueous dispersion by mixing the pigment with water in the presence of a dispersing agent. The dispersing agent is monoisopropanolamine in an amount of from 0.1% to 0.3% by weight of titanium dioxide, a water-soluble phosphate in an amount of 0.05% to 0.5% by weight, expressed as $P_2O_5$, or a mixture of the monoisopropanolamine and the water-soluble phosphate or the dispersing agent may be a water-soluble silicate in an amount of from 0.1% to 0.5% by weight expressed as $SiO_2$ used alone or together with the monoisopropanolamine and/or the phosphate. Usually the water-soluble phosphate is a water-soluble salt of phosphoric acid and particularly useful are alkali metal dihydrogen phosphates such as sodium dihydrogen phosphate. An alternative phosphate may be a polymeric alkali metal phosphate such as sodium hexametaphosphate. The water-soluble silicate is usually an alkali metal silicate, preferably sodium silicate.

To the formed aqueous dispersion of titanium dioxide containing the dispersing agent there is then added a number of different water-soluble compounds and initially, if the dispersing agent employed is not solely a phosphate, a water-soluble phosphate is added in an amount of from 0.5% to 1% by weight expressed as $P_2O_5$ on the weight of $TiO_2$. Typical water-soluble phosphates which may be added at this stage are those which may be added initially as the dispersing agent.

To the aqueous dispersion of titanium dioxide is added a water-soluble hydrolysable acidic compound of zirconium in an amount of from 0.2% to 2.5% by weight expressed as $ZrO_2$ on the weight of $TiO_2$. Typical examples of suitable zirconium compounds are hydrolysable zirconium salts such as zirconium sulphate or zirconium chloride. Preferably the amount of the water-soluble hydrolysable acidic compound of zirconium added is from 0.25% to 0.75% by weight expressed as $ZrO_2$ on $TiO_2$.

A water-soluble hydrolysable acidic compound of aluminium is also added to the aqueous dispersion and the amount of the compound added is from 0.2% to 2.5% by weight expressed as $Al_2O_3$ on the weight of $TiO_2$. Typical acidic compounds of aluminium which may be employed are aluminium chloride or aluminium nitrate but usually aluminium sulphate will form the source of the alumina subsequently to be deposited. Preferably the amount of the acidic compound of aluminium added is from 0.5% to 1.5% by weight expressed as $Al_2O_3$ on the weight of $TiO_2$. If desired the acidic compound of aluminium may be added to the aqueous dispersion in the form of a mixed aqueous solution of zirconium sulphate and aluminium sulphate containing amounts of zirconium sulphate and aluminium sulphate in the required proportions.

Usually after the addition of the acidic compound to the aqueous dispersion the aqueous dispersion is allowed to reach homogenity prior to the addition of a subsequent reagent.

Optionally a water-soluble silicate may be added to the aqueous dispersion prior to the addition of the water-soluble alkaline compound of aluminium. An amount of silicate of up to 1% by weight expressed as $SiO_2$ on the $TiO_2$ may be added.

To the aqueous dispersion of titanium dioxide is finally added a water-soluble hydrolysable alkaline compound of aluminium in an amount of from 0.5% to 2.5% by weight expressed as $Al_2O_3$ on the weight of $TiO_2$. Preferably the amount of the alkaline compound of aluminium added is from 1.0% to 1.5% by weight expressed as $Al_2O_3$ on the weight of $TiO_2$. The alkaline compound of aluminium which is added is suitably an alkali metal aluminate such as sodium aluminate.

Usually during the process of the present invention the various reagents added to the aqueous dispersion of titanium dioxide are added as aqueous solutions or mixed solutions to facilitate easy incorporation of the reagent in the aqueous dispersion, but if desired, the solid reagent may be added.

After the addition of the alkaline compound of aluminium the aqueous dispersion is usually allowed to reach homogeneity whilst continuing the stirring which is carried out throughout the process of the invention prior to adjusting the pH of the dispersion, if necessary, to a value within the range 6.5 to 8.5 to produce the desired treated titanium dioxide pigment having the desired pH suitable for any particular desired use. Typically the pH of the aqueous dispersion may be adjusted by the addition to the aqueous dispersion of a dilute mineral acid or an alkali for instance, by the addition of dilute sulphuric acid, sodium hydroxide or sodium carbonate. If desired the pH of the aqueous dispersion may be increased by adding a mixture of sodium aluminate and sodium hydroxide or by firstly adding such a mixture to increase the pH to a value of from 10 to 10.5 followed by mineral acid or an acid aluminium salt to reduce the pH to from 7 to 7.5.

During the process of the present invention there becomes associated with the titanium dioxide pigment a number of hydrous oxides and it is believed that the titanium dioxide particles become coated with these hydrous oxides and although it is believed that a hydrous oxide of silicon, a hydrous oxide of aluminium and a hydrous oxide of zirconium together with a phosphate are deposited on the particles of titanium dioxide, it may be possible that an aluminium silicate and/or a zirconium silicate is precipitated in association with the pigment.

The pigments obtained by the process of the present invention are useful in the preparation of a wide variety of paints and when so used, particularly in oleoresinous paints, have a reduced photochemical activity, i.e. have an improved durability. The paints incorporating the pigments of the present invention have an improved gloss and opacity.

The invention is illustrated in the following Examples.

EXAMPLE 1

A 2156 gram sample of dry milled rutile titanium dioxide base pigment containing approximately 0.12% $Al_2O_3$ which had been prepared by the sulphate process was suspended in 2426 mls of distilled water. To the suspension 154 mls of sodium hexametaphosphate solution (7.0% $P_2O_5$) and 5140 mls of Ottawa sand were added. The slurry was milled for 60 minutes in an 8" diameter pot with 4 × 5 discs (separation 1.5) at 1890 r.p.m. The sand was separated from the pigment by passing the slurry successively through a 100 mesh and then 325 mesh sieve.

Sand-free slurry containing 1 kilogram of the titanium dioxide was diluted to 200 gl$^{-1}$ with distilled water, stirred to ensure efficient mixing during subsequent reagent additions and heated to 45° C. The pH at the end of this stage was 7.9. The pH of the slurry was raised to 11.0 by the addition of 30 mls of 2.75 M sodium hydroxide. 119 mls of a mixed acidic solution of aluminium sulphate and zirconium orthosulphate (8.4% $Al_2O_3$ and 4.7% $ZrO_2$) were added at a rate of 5.95 mls per minute and mixed for 10 minutes. The pH at this stage was 1.8.

189 mls of sodium aluminate solution (9.0% $Al_2O_3$ and 19.4% $Na_2O$) were then added at a rate of 6.3 mls per minute and when pH 10 was reached 80 mls of 1.9 M sulphuric acid were added simultaneously but separately to maintain pH in the range 10 to 10.5. The slurry was mixed for 45 minutes and the pH at the end of this stage was 10.2. The pH of the slurry was reduced to 7.0 with 1.9 M sulphuric acid (45 mls) over 20 minutes and the pH maintained for 15 minutes while mixing.

The treated titanium dioxide was recovered by filtration. The filter cake was washed twice with 1 liter of distilled water, reslurried in distilled water, refiltered and again washed twice with 1 liter of distilled water. The pigment was dried for 16 hours at 105° C then fluid energy milled in a laboratory 6 inches diameter air microniser.

The pigment was tested to determine the stoving gloss, opacity and durability as expressed by the gloss reading (GR) and chalk rating (CR). The properties of the pigment are compared with various commercial titanium dioxide pigments having the constitution as follows:-

Control 1 - A "sulphate" process titanium dioxide pigment coated with 1.3% $SiO_2$, 2.4% $Al_2O_3$ and 1.0% $TiO_2$ be weight of pigment.

Control 2 - A "sulphate" process titanium dioxide pigment coated with 3% $Al_2O_3$ and 1.0% $TiO_2$.

Control 3 - A "sulphate" process titanium dioxide pigment coated with 2.5% $Al_2O_3$ and 0.9% $TiO_2$.

The stoving gloss was measured by baking paints based on an alkyd/urea-formaldehyde resin system at different temperatures.

The opacity was measured as the reflectance in a Harrison Colourmeter of a 22 micron thick paint film prepared from a long oil soya alkyd resin at a pigment volume concentration of 17%.

The durability was measured by incorporating the pigment in a paint based on an alkyd resin and coated panels prepared. The painted panels were tested in a Marr Weatherometer for various times.

The results are shown in the following Tables 1 and 2.

TABLE 1

| Example | Stoving Gloss | | Opacity |
|---|---|---|---|
| | 120° C | 180° C | |
| 1 | 75.5 | 29.0 | 516.6 |
| Control 2 | 74.5 | 25.0 | |
| Control 3 | | | 511.5 |

TABLE 2

| Ex. Test | | 0 | 250 | 500 | 750 | 1000 | 1250 | 1500 | 1750 | 2000 |
|---|---|---|---|---|---|---|---|---|---|---|
| 1 | GR | 93 | 73 | 57 | 36 | 20 | 15 | 11 | 13 | 13 |
|  | CR | 10 | 9 | 9 | 9 | 9 | 8 | 8 | 8 | 6 |
| Control 1 | GR | 97 | 67 | 46 | 27 | 16 | 13 | 8 | — | — |
|  | CR | 10 | 9 | 9 | 9 | 9 | 8 | 8 | 7 | 8 |

Durability After Time (Hours)

EXAMPLE 2

A 2156 gram sample of dry milled rutile titanium dioxide base pigment containing approximately 0.2% $Al_2O_3$ which had been prepared by the sulphate process was suspended in 2426 mls of distilled water. To the suspension 2.2 mls of monoisopropanolamine and 5140 mls of Ottawa sand were added. The slurry was milled for 60 minutes in an 8 inches diameter pot with 4 × 5 inches discs (separation 1.5 inches) at 1890 r.p.m. The sand was separated from the pigment by passing the slurry successively through a 100 mesh then a 325 mesh sieve.

Sand-free slurry containing 1000 grams of titanium dioxide was diluted to 220 gl$^{-1}$ with distilled water and stirred to ensure efficient mixing during subsequent reagent additions. 71 mls of sodium hexametaphosphate solution (7.0% $P_2O_5$) were added at a rate of 7.1 mls per minute and the slurry heated to 50° C. At the end of this stage the pH was 8.3. 163 mls of a mixed acid solution of aluminium sulphate and zirconium orthosulphate (9.2% $Al_2O_3$ and 3.1% $ZrO_2$) were added at a rate of 8.15 mls per minute. When the pH of the slurry reached 3.0, 2.75 M sodium hydroxide solution was added to maintain this pH. 130 mls of sodium aluminate solution (8.8% $Al_2O_3$ and 17.6% $Na_2O$) were added at a rate of 3.25 mls per minute. The pH at the end of this stage was 8.6. The slurry was heated to 60° C and mixed for 45 minutes. The pH at the end of this stage was 8.4.

The titanium dioxide pigment was recovered by filtration. The filter cake was washed twice with 1 liter of distilled water, reslurried in distilled water, refiltered and again washed twice with 1 liter of distilled water. The filter cake was additioned with 0.4% trimethylolpropane, dried for 16 hours at 105° C, then fluid energy milled in an 8 steam microniser.

The pigment was tested as described in Example 1 and the results shown in Tables 3 and 4 following:-

TABLE 3

| Example | Stoving Gloss 120° C | Stoving Gloss 180° C | Opacity |
|---|---|---|---|
| 2 | 78.0 | 27.0 | 510.5 |
| Control 2 | 75.0 | 30.5 |  |
| Control 3 |  |  | 508.0 |

TABLE 4

| Ex. Test | | 0 | 250 | 500 | 750 | 1000 | 1250 | 1500 | 1750 |
|---|---|---|---|---|---|---|---|---|---|
| 2 | GR | 100 | 69 | 62 | 54 | 40 | 30 | 20 | 12 |
|  | CR | 10 | 9 | 9 | 9 | 8 | 8 | 7 | 6 |
| Control 1 | GR | 100 | 77 | 64 | 45 | 29 | 20 | 11 | 6 |
|  | CR | 10 | 9 | 9 | 9 | 9 | 9 | 9 | 6 |

Durability After Time (Hours)

EXAMPLE 3

A 2156 gram sample of dry milled rutile titanium dioxide base pigment, containing approximately 0.2% $Al_2O_3$ which had been prepared by the sulphate process was suspended in 2426 mls of distilled water. To the suspension 64 mls of sodium silicate solution (10.0% $SiO_2$, 3.18% $Na_2O$) and 5140 mls of Ottawa sand were added. The slurry was milled for 60 minutes in an 8 inches diameter pot with 4 × 5 inches discs (separation 1.5 inches) at 1890 r.p.m. The sand was separated from the pigment by passing the slurry successively through a 100 mesh then a 325 mesh sieve.

Sand-free slurry containing 1000 grams of titanium dioxide was diluted to 220 gl$^{-1}$ with distilled water and stirred to ensure efficient mixing during subsequent reagent additions. 71 mls of sodium hexametaphosphate solution (7.0% $P_2O_5$) were added at a rate of 7.1 mls per minute and the slurry heated to 50° C. At the end of this stage the pH was 8.5. 177 mls of a mixed solution of aluminium sulphate and zirconium orthosulphate (8.4% $Al_2O_3$ and 4.2% $ZrO_2$) were added at a rate of 8.85 mls per minute. When the pH of the slurry reached 3.0, 2.75 M sodium hydroxide solution was added to maintain this pH. 20 mls of sodium silicate solution (10.0% $SiO_2$ and 3.18% $Na_2O$) were added at a rate of 4 mls per minute and the slurry was mixed for 5 minutes. The pH at the end of this stage was 3.2. 110 mls of sodium aluminate solution (7.0% $Al_2O_3$ and 17.5% $Na_2O$) were added at a rate of 3.67 mls per minute. The pH at the end of this stage was 8.7. The slurry was heated to 60° C and mixed for 45 minutes. The pH at the end of this stage was 8.5.

The treated titanium dioxide was recovered by filtration. The filter cake was washed twice with 1 liter of distilled water, reslurried in distilled water, refiltered and again washed twice with 1 liter of distilled water. The filter cake was additioned with 0.4% trimethylolpropane, dried for 16 hours at 105° C, then fluid energy milled in an 8 inches steam microniser.

EXAMPLE 4

A 2156 gram sample of dry milled rutile titanium dioxide base pigment, containing approximately 0.2% $Al_2O_3$, which had been prepared by the sulphate process was suspended in 2426 mls of distilled water. To the suspension 64 mls of sodium silicate solution (10.0% $SiO_2$, 3.18% $Na_2O$) and 5140 mls of Ottawa sand were added. The slurry was milled for 60 minutes in an 8 inches diameter pot with 4 × 5 inches discs (separation 1.5 inches) at 1890 r.p.m. The sand was separated from the pigment slurry by successive passage through a 100 mesh and a 325 mesh sieve.

Sand-free slurry containing 1000 grams titanium dioxide was diluted to 220 gl$^{-1}$ with distilled water and stirred to ensure efficient mixing during subsequent reagent additions. 71 mls of sodium hexametaphosphate solution (7.0% $P_2O_5$) were added at a rate of 7.1 mls per minute and the slurry heated to 50° C. At the end of this stage the pH was 8.5. 174 mls of a mixed solution of zirconium orthosulphate and aluminium sulphate (12.7% $ZrO_2$ and 5.8% $Al_2O_3$), were added at a rate of 5.8 mls per minute. When the pH of the slurry reached 3.0, 2.75M sodium hydroxide solution was added to maintain this pH. 100 mls of sodium aluminate solution (7.0% $Al_2O_3$ and 17.5% $Na_2O$) were added at a rate of 3.3 mls per minute. The pH at this stage was 8.5. The slurry was heated to 60° C and mixed for 45 minutes. The pH at the end of this stage was 8.4.

The treated titanium dioxide was recovered by filtration. The filter cake was washed twice with distilled water, 1 liter at each washing, reslurried in distilled water, refiltered and again washed twice with 1 liter of distilled water. The filter cake was additioned with 0.4% trimethylolpropane, dried for 16 hours at 105° C, then fluid energy milled in an 8 steam microniser.

The pigments obtained in Examples 3 and 4 were tested as described in Example 1 and the results are shown in the following Tables 5 and 6.

TABLE 5

| Example | Stoving Gloss 120° C | 180° C | Opacity |
|---|---|---|---|
| 3 | 67.5 | 21.0 | 512.0 |
| 4 | 72.0 | 20.0 | 514.5 |
| Control 2 | 72.5 | 28.0 | |
| Control 3 | | | 516.0 |

TABLE 6

| Example | Test | Durability After Time (Hours) 0 | 250 | 500 | 750 | 1000 | 1250 |
|---|---|---|---|---|---|---|---|
| 3 | GR | 95 | 68 | 66 | 53 | 38 | 24 |
|  | CR | — | — | 9 | 9 | 9 | 9 |
| 4 | GR | 87 | 72 | 58 | 48 | 39 | 27 |
|  | CR | — | — | 9 | 9 | 9 | 9 |
| Control 1 | GR | 94 | 68 | 62 | 50 | 27 | 12 |
|  | CR | — | — | 9 | 9 | 9 | 9 |

EXAMPLE 5

A 1500 gram sample of "chloride" process rutile titanium dioxide containing approximately 1.6% $Al_2O_3$ was slurried in water at 400 $gl^{-1}$. 15 mls of sodium hexametaphosphate solution (7.0% $P_2O_5$) were added and the pH adjusted to 9.0 with 2.75 M sodium hydroxide. The slurry was stirred for 16 hours and then classified by passing through a 325 mesh sieve. Classified slurry containing 1200 grams of titanium dioxide was diluted to 220 $gl^{-1}$. The diluted slurry was heated to 50° C and stirred to ensure efficient mixing during subsequent reagent additions. The pH at the end of this stage was 8.0.

77 mls of sodium hexametaphosphate solution (7.0% $P_2O_5$) were added at a rate of 2.9 mls per minute and the slurry mixed for 5 minutes. At the end of this stage the pH was 8.7. 239 mls of a mixed acidic solution of aluminium sulphate and zirconium orthosulphate (8.3% $Al_2O_3$ and 4.1% $ZrO_2$) were added at a rate of 11.95 mls per minute and when pH 3 was reached 250 mls of 2.75 M sodium hydroxide solution was added simultaneously but separately to maintain pH in the range 2.8 to 3.2. The slurry was mixed for five minutes and the pH at this stage was 3.1. 170 mls of caustic sodium aluminate solution (9.0% $Al_2O_3$ and 19.0% $Na_2O$) were added at a rate of 5.66 mls per minute. The pH at the end of this stage was 8.7. The slurry was heated to 60° C and mixed for 45 minutes. The pH at the end of this stage was 8.5.

The treated titanium dioxide was recovered by filtration. The filter cake was washed twice with 1 liter of distilled water, reslurried in distilled water, refiltered and dried for 16 hours at 105° C then fluid energy milled in an 8 diameter steam microniser.

EXAMPLE 6

A 1500 gram sample of "chloride" process rutile titanium dioxide containing approximately 1.6% $Al_2O_3$ was slurried in water at 400 $gl^{-1}$. 15 mls of sodium hexametaphosphate solution (7.0% $P_2O_5$) were added and the pH was adjusted to 9.0 with 2.75 M sodium hydroxide solution. The slurry was stirred for 16 hours and then classified by passage through a 325 mesh sieve. Classified slurry containing 1200 grams of titanium dioxide was diluted to 220 $gl^{-1}$. The diluted slurry was heated to 50° C and stirred to ensure efficient mixing during subsequent reagent addition. The pH at the end of this stage was 8.9. 77 mls of sodium hexametaphosphate solution (7.0% $P_2O_5$) were added at a rate of 2.9 mls per minute. 82 mls of a mixed acidic solution of aluminium sulphate and zirconium orthosulphate (7.3% $Al_2O_3$ and 7.3% $ZrO_2$) were added at a rate of 4.1 mls per minute then mixed for 10 minutes. The pH at the end of this stage was 1.8. 201 mls of caustic sodium aluminate solution (9.0% $Al_2O_3$ and 19.0% $Na_2O$) were added at a rate of 10 mls per minute. The temperature was increased to 60° C and the slurry stirred for 10 minutes. At the end of this stage the pH was 10.8. The pH of the slurry was reduced to 7.0 with 10% sulphuric acid over 15 minutes and held at this pH for 30 minutes.

The treated titanium dioxide was recovered was recovered by filtration. The filter cake was washed twice with 1 liter of distilled water, reslurried in distilled water, refiltered and washed twice with 1 liter of distilled water, dried for 16 hours at 105° C then fluid energy milled in an 8 steam microniser.

EXAMPLE 7

A 1500 gram sample of "chloride" process rutile titanium dioxide base pigment was suspended in 3385 mls of distilled water. The pH of the slurry was adjusted to pH 9 with 2.75 M sodium hydroxide solution and 15 mls sodium hexametaphosphate solution (7.0% $P_2O_5$) were added. The slurry was stirred for 16 hours then classified by passing through a 325 mesh sieve. Classified slurry containing 1200 grams titanium dioxide was taken, diluted to 220 $gl^{-1}$ with distilled water, stirred to ensure efficient mixing during subsequent reagent additions and heated to 50° C. The pH at this stage was 8.9.

77 mls of sodium hexametaphosphate solution (7.0% $P_2O_5$) were added at a rate of 2.6 mls per minute and mixed for 10 minutes. The pH at this stage was 9.1. 164 mls of a mixed acidic solution of aluminium sulphate and zirconium orthosulphate (7.3% $Al_2O_3$ and 7.3% $ZrO_2$) were added at a rate of 8.2 mls per minute and mixed for 10 minutes. The pH at this stage was 1.8. 201 mls of caustic sodium aluminate solution (8.95% $Al_2O_3$ and 18.9% $Na_2O$) were added at a rate of 10 mls per minute, the temperature raised to 60° C and stirred for 15 minutes. The pH at the end of this stage was 7.7.

The treated titanium dioxide was recovered by filtration. The filter cake was washed twice with distilled water, reslurried in distilled water, refiltered and again washed twice with distilled water. The filter cake was additioned with 7.3 mls of an aqueous solution of trimethylolpropane (66% T.M.P.), dried for 16 hours at 105° C, then energy milled in an 8 inches steam microniser.

The pigments obtained in Examples 5, 6 and 7 were tested as described in Example 1 and the results are shown in Tables 7 and 8 following. An additional Control 4 was used which was a "chloride" process pigment coated with 0.5% $P_2O_5$, 4.0% $Al_2O_3$ and 2.0% $SiO_2$ by weight of pigment.

TABLE 7

| Example | Stoving Gloss 120° C | 180° C | Opacity |
|---|---|---|---|
| 5 | 75.0 | 17.0 | 517.0 |
| 6 | 71.0 | 12.0 | 513.5 |
| 7 | 76.0 | 19.0 | 513.5 |
| Control 4 | 73.0 | 7.0 | 507.0 |

TABLE 7-continued

| Example | Stoving Gloss 120° C | 180° C | Opacity |
|---|---|---|---|
| Control 3 | | | 513.5 |

TABLE 8

| Example | Test | Durability After Time (Hours) | | | | | | | |
|---|---|---|---|---|---|---|---|---|---|
| | | 0 | 250 | 500 | 750 | 1000 | 1250 | 1500 | 1750 |
| 5 | GR | 82 | 57 | 57 | 38 | 27 | 15 | 10 | — |
| | CR | 10 | 9 | 9 | 9 | 9 | 7 | 6 | 5 |
| 6 | GR | 79 | 69 | 60 | 38 | 25 | 15 | 11 | — |
| | CR | 10 | 9 | 11 9 | 9 | 9 | 6 | 5 | 4 |
| 7 | GR | 76 | 67 | 57 | 40 | 26 | 16 | 13 | — |
| | CR | 10 | 9 | 9 | 9 | 9 | 8 | 6 | 5 |
| Control 1 | GR | 79 | 73 | 62 | 28 | 19 | 10 | 7 | — |
| | CR | 10 | 9 | 9 | 9 | 9 | 6 | 5 | 5 |
| Control 4 | GR | 82 | 50 | 53 | 19 | 11 | 4 | 2 | — |
| | CR | 10 | 9 | 9 | 9 | 8 | 5 | 3 | 3 |

What is claimed is:

1. A process for the treatment of titanium dioxide pigment which comprises forming an aqueous dispersion of titanium dioxide containing as a dispersant 0.1% to 0.3% by weight of monoisopropanolamine, a water-soluble phosphate in an amount of 0.05% to 0.5% by weight expressed as $P_2O_5$ or a mixture thereof, or a water-soluble silicate in an amount of 0.1% to 0.5% by weight expressed as $SiO_2$ used alone or together with monoisopropanolamine and/or the phosphate, adding to the aqueous dispersion a water-soluble phosphate in an amount of 0.05% to 1.0% by weight expressed as $P_2O_5$ when the dispersing agent is not solely a phosphate, a water-soluble hydrolysable acidic compound of zirconium in an amount of from 0.2% to 2.5% by weight expressed as $ZrO_2$, a water-soluble hydrolysable acidic compound of aluminium in an amount of from 0.2% to 2.5% by weight expressed as $Al_2O_3$, a water-soluble compound of silicon in an amount of from 0% to 1% by weight expressed as $SiO_2$, and a water-soluble hydrolysable alkaline compound of aluminium in an amount of 0.5% to 2.5% by weight expressed as $Al_2O_3$, and adjusting the pH of the dispersion, if necessary, to a value of pH 6.5 to 8.5 prior to recovering the treated pigment from the dispersion will all the percentages by weight being based on the weight of titanium dioxide in the aqueous dispersion.

2. A process according to claim 1 in which the titanium dioxide to be treated is a calcined titanium dioxide.

3. A process according to claim 1 in which the titanium dioxide to be treated contains from 0.1% to 0.5% by weight $Al_2O_3$ on the weight of $TiO_2$.

4. A process according to claim 1 in which the titanium dioxide is rutile titanium dioxide containing at least 95% by weight of its $TiO_2$ content in the rutile form.

5. A process according to claim 1 in which the water-soluble phosphate is a water-soluble salt of phosphoric acid.

6. A process according to claim 5 in which the phosphate is an alkali metal dihydrogen phosphate.

7. A process according to claim 1 in which the water-soluble phosphate is a polymeric phosphate.

8. A process according to claim 7 in which the phosphate is sodium hexametaphosphate.

9. A process according to claim 1 in which the water-soluble hydrolysable acid compound is added in an amount equivalent to 0.25% to 0.75% by weight $ZrO_2$.

10. A process according to claim 1 in which the water-soluble hydrolysable acidic compound of aluminium is added in an amount of from 0.5% to 1.5% by weight expressed as $Al_2O_3$.

11. A process according to claim 1 in which acid compounds of zirconium and of aluminium are added to the aqueous dispersion as a mixed aqueous solution.

12. A process according to claim 1 in which the water-soluble hydrolysable alkaline compound is added to the aqueous dispersion in an amount of from 1.0% to 1.5% by weight expressed as $Al_2O_3$.

13. A process for the treatment of titanium dioxide pigment prepared by the vapor phase oxidation of a titanium halide, which comprises forming an aqueous dispersion of titanium dioxide containing as a dispersant a water-soluble phosphate in an amount of 0.05% to 0.5% by weight expressed as $P_2O_5$, adding to the aqueous dispersion a water-soluble phosphate in an amount of 0.05% to 1.0 % by weight expressed as $P_2O_5$, a water-soluble hydrolysable acidic compound of zirconium in an amount of from 0.2% to 2.5% by weight expressed as $ZrO_2$, a water-soluble hydroylsable acidic compound of aluminum in an amount of from 0.2% to 2.5% by weight expressed as $Al_2O_3$, a water-soluble compound of silicon in an amount of from 0% to 1% by weight expressed as $SiO_2$, and a water-soluble hydrolysable alkaline compound of aluminum in an amount of 0.5% to 2.5% by weight expressed as $Al_2O_3$, and adjusting the pH of the dispersion, if necessary, to a value of pH 6.5 to 8.5 prior to recovering the treated pigment from the dispersion with all the percentages by weight being used on the weight of titanium dioxide in the aqueous dispersion.

* * * * *